(12) United States Patent
Addis

(10) Patent No.: US 7,752,834 B2
(45) Date of Patent: Jul. 13, 2010

(54) AIRCRAFT PROPULSION SYSTEMS

(75) Inventor: Mark Addis, Kennebunk, ME (US)

(73) Assignee: United Technologies Corporation, Hartford, CT (US)

( * ) Notice: Subject to any disclaimer, the term of this patent is extended or adjusted under 35 U.S.C. 154(b) by 931 days.

(21) Appl. No.: 11/586,172

(22) Filed: Oct. 25, 2006

(65) Prior Publication Data
US 2008/0098719 A1 May 1, 2008

(51) Int. Cl.
*F02K 3/00* (2006.01)
(52) U.S. Cl. .......................... 60/224; 60/226.1; 244/60
(58) Field of Classification Search .................. 60/224, 60/225, 226.1; 244/60, 55
See application file for complete search history.

(56) References Cited
U.S. PATENT DOCUMENTS

| | | | |
|---|---|---|---|
| 2,783,003 A | | 2/1957 | Ralston et al. |
| 3,018,034 A | * | 1/1962 | Ferri ............................ 60/269 |
| 3,194,516 A | | 7/1965 | Messerschmitt |
| 3,212,733 A | | 10/1965 | Kutney |
| 3,251,567 A | | 5/1966 | Messerschmitt |
| 3,302,907 A | | 2/1967 | Wilde et al. |
| 3,983,833 A | * | 10/1976 | Eickmann ...................... 440/5 |
| 4,175,640 A | | 11/1979 | Birch et al. |
| 4,456,458 A | * | 6/1984 | Gilbertson .................... 55/306 |
| 4,605,185 A | | 8/1986 | Reyes |
| 4,881,367 A | * | 11/1989 | Flatman ........................ 60/785 |
| 4,925,131 A | | 5/1990 | Eickmann |
| 4,982,914 A | | 1/1991 | Eickmann |
| 5,271,295 A | * | 12/1993 | Marnot ...................... 74/665 B |
| 5,275,356 A | * | 1/1994 | Bollinger et al. ............. 244/12.3 |
| 5,312,069 A | * | 5/1994 | Bollinger et al. ............. 244/12.3 |
| 5,320,305 A | | 6/1994 | Oatway et al. |
| 5,483,791 A | * | 1/1996 | Kotwal et al. .................. 60/796 |
| 5,666,803 A | | 9/1997 | Windisch |
| 5,725,180 A | | 3/1998 | Chamay et al. |
| 5,906,334 A | * | 5/1999 | Chamay et al. ............ 244/53 B |
| 6,039,287 A | | 3/2000 | Liston et al. |
| 6,098,927 A | | 8/2000 | Gevers |
| 6,688,552 B2 | * | 2/2004 | Franchet et al. ............. 244/12.3 |
| 6,895,741 B2 | * | 5/2005 | Rago et al. .................. 60/226.1 |
| 6,904,750 B2 | * | 6/2005 | Venkataramani et al. ... 60/226.1 |
| 7,107,755 B2 | * | 9/2006 | El Hamel et al. .............. 60/224 |
| 2004/0025493 A1 | | 2/2004 | Wojciechowski |
| 2006/0011780 A1 | | 1/2006 | Brand et al. |
| 2008/0099632 A1 | * | 5/2008 | Addis ........................ 244/53 B |

* cited by examiner

*Primary Examiner*—William H Rodríguez
(74) *Attorney, Agent, or Firm*—Colin L. Cini

(57) ABSTRACT

Disclosed are propulsion systems 30 providing reduced fuel burn, weight and cost. A single gas generator core 38 drives multiple bladed propulsion elements 36 with a power train 48. The core 38 has a forward compressor 56 and a rearward turbine 40 and rotates about a longitudinal core axis 62. The bladed propulsion elements 36 rotate about bladed propulsion element axes 78 that are not coaxial with the core axis 62. The bladed propulsion elements 36 discharge an ambient air stream 50 rearward as a bypass stream 52 portion and a core stream 54 portion. The core stream 54 portion is directed to the compressor 56. The propulsion systems 30 mount inside a fuselage 22 of an airframe 20 or they are suspended beneath a wing 24 via pylons 32.

13 Claims, 8 Drawing Sheets

AIRCRAFT PROPULSION SYSTEMS

CROSS-REFERENCE TO RELATED APPLICATIONS

This application discloses subject matter related to copending United States patent application entitled, "AIRCRAFT AIRFRAME ARCHITECTURES", 11/586,175 and filed concurrently herewith, the contents of which is herein incorporated by reference.

BACKGROUND OF THE INVENTION (1) Field of the Invention

The invention relates to the airline industry in general and more specifically to improved propulsion systems for powering aircraft airframes.

(2) Description of the Related Art

As illustrated in FIGS. 1-2, commercial aircraft airframes 20 have a central fuselage 22 for carrying passengers and cargo, wings 24 extending outwardly from the fuselage 22 for providing lift, a rear mounted tail 26 and variable surfaces 28 for control. Typically, the airframe 22 is powered by one or more propulsion systems 30 mounted in various arrangements. The propulsion systems 30 may be mounted alongside the rear portion of the fuselage 22 (FIG. 1), mounted in the tail 26 or they may be suspended beneath the wings 24 from pylons 32 (FIG. 2). For example, McDonnell Douglas DC-9 and MD-80 style aircraft models have propulsion systems 30 mounted alongside the rear portion of the fuselage 22. McDonnell Douglas MD-11 and Lockheed L-1011 style aircraft models have propulsion systems 30 mounted under the wings 24 and inside the tail 26. Boeing B-747 and Airbus A-380 style aircraft have propulsion systems 30 suspended beneath the wings 24 only. Although these aircraft are exemplary, other aircraft styles exist. The propulsion systems 30 are usually streamlined with outer cowlings 34, oftentimes referred to as nacelles, to reduce aerodynamic drag. In each of the above prior art propulsion systems 30, a bladed propulsion element such as a propeller or bladed propulsion element is driven by a dedicated gas generator core 38.

Propulsion system 30 fuel burn and weight are extremely important to all airline operators. Estimates indicate that aviation fuel charges represent approximately thirty percent of an operator's yearly recurring costs. Since the propulsion systems 30 run for extended periods while an aircraft is in flight, any reduction in fuel burn or weight can save an operator considerable money over the lifetime of the propulsion system 30.

As illustrated in FIG. 3, a conventional propulsion system 30 has a large diameter bladed propulsion element 36 that is driven by a gas generator core 38. These propulsion systems 30 are referred to as high bypass ratio turbofans and, due to their low fuel burn, are now commonplace in the commercial airline industry.

The bladed propulsion element 36 of the lower half of FIG. 3 is directly coupled to a turbine 40 in the rear of the propulsion system 30 via a primary shaft 42. Expanding core gases 44 drive the turbine 40, thus providing the necessary energy to drive the primary shaft 42, which drives the bladed propulsion element 36. Since the bladed propulsion element 36 is directly coupled to the turbine 40, the bladed propulsion element 36 rotates at a relatively high speed. The high speed of the bladed propulsion element 36 produces very high tensile loads on the other rotational components, so these components are made considerably larger and heavier to prevent failure. The added thrust of a larger bladed propulsion element 36 is often negated by the weight increase, making ever-larger bladed propulsion elements 36 an unattractive alternative for reduced fuel burn. The speed at which a large bladed propulsion element 36 rotates is also too fast for optimum aerodynamic efficiency and wing 24 to runway clearance is a limitation as well.

An alternative propulsion system 30 architecture is called a Geared TurboFan (GTF) and is shown in the upper half of FIG. 3. Here, the turbine 40 drives a large bladed propulsion element 36 at a slower speed through a reduction gearbox 46. The turbine 40 drives the bladed propulsion element 36 without excessively loading the rotational components. By turning the bladed propulsion element 36 at a slower speed than the turbine 40, the bladed propulsion element 36 operates at its optimum aerodynamic efficiency as well. Although the GTF provides benefits over other high bypass ratio turbofans, the wing 24 to runway clearance ultimately limits the maximum obtainable bladed propulsion element 36 diameter.

While the above-described propulsion systems 30 provide reduced fuel burn, there are still limitations to the size of the bladed propulsion element 36 that may be driven. The larger bladed propulsion element 36 size and reduction gearbox 46 also increases the weight of the engine. Improved propulsion systems 30, which further reduce fuel burn and weight over the current state of the art, are therefore needed.

BRIEF SUMMARY OF THE INVENTION

In accordance with the present invention, there is provided an aircraft propulsion system having a single gas generator core driving multiple bladed propulsion elements. These may be fans or propellers. The gas generator core resides inside the fuselage or suspended beneath the wing of the aircraft airframe, while the bladed propulsion elements mount externally.

In a first embodiment of a propulsion system, a rearward turbine drives a forward compressor via a central shaft rotating about a longitudinal, core axis. The central shaft extends forward of the compressor and drives a power train, which in turn drives the multiple bladed propulsion elements. Each bladed propulsion element is driven about a bladed propulsion element axis that is not coaxial with the longitudinal core axis. An ambient air stream is discharged rearward by the bladed propulsion elements and an inlet duct directs a portion of the air streams into the compressor.

In a second embodiment of a propulsion system, the rearward turbine drives a forward compressor and a central gearbox via a central shaft rotating about a longitudinal core axis. The gearbox drives a tower shaft connected to a power train, which in turn drives multiple bladed propulsion elements. Each bladed propulsion element is rotationally driven by the power train about a bladed propulsion element axis that is not coaxial with the core axis. An ambient air stream is discharged rearward by the bladed propulsion elements and an inlet duct directs a portion of the air streams into the compressor.

A primary advantage of the present arrangements is the ability to reduce fuel burn and weight by driving multiple bladed propulsion elements with a single gas generator core.

These and other objects, features and advantages of the present invention will become apparent in view of the following detailed description and accompanying figures of multiple embodiments, where corresponding identifiers represent like features between the various figures.

DETAILED DESCRIPTION OF THE INVENTION

Figure 1:
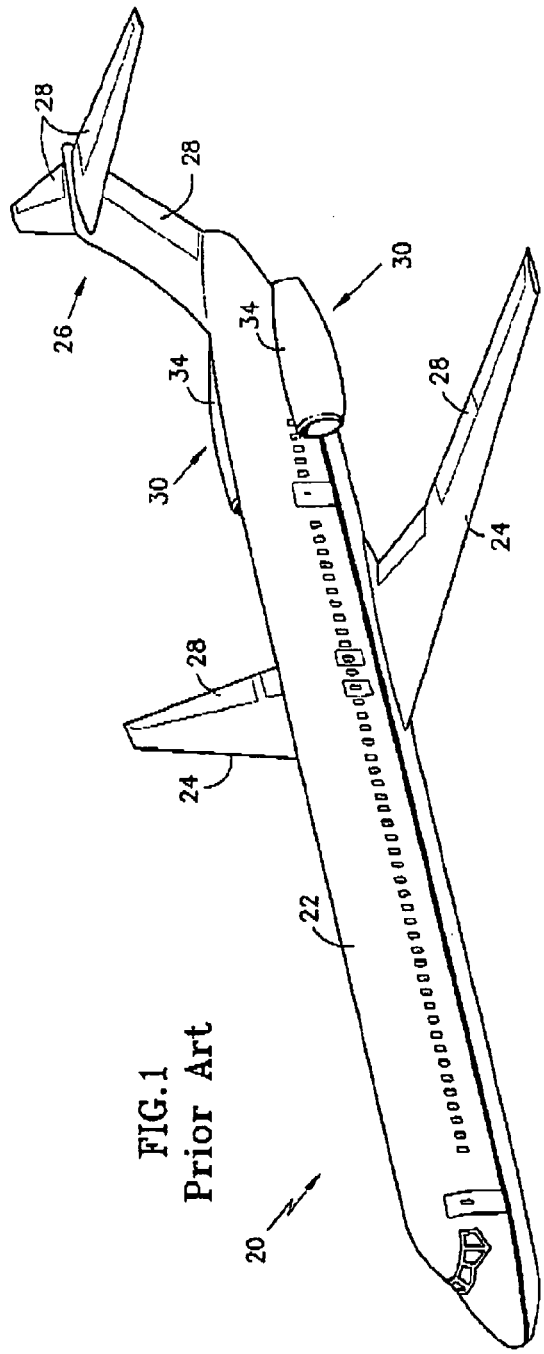
FIG. 1 illustrates a prior art aircraft airframe with a conventional, rear-mounted propulsion system.
Figure 2:
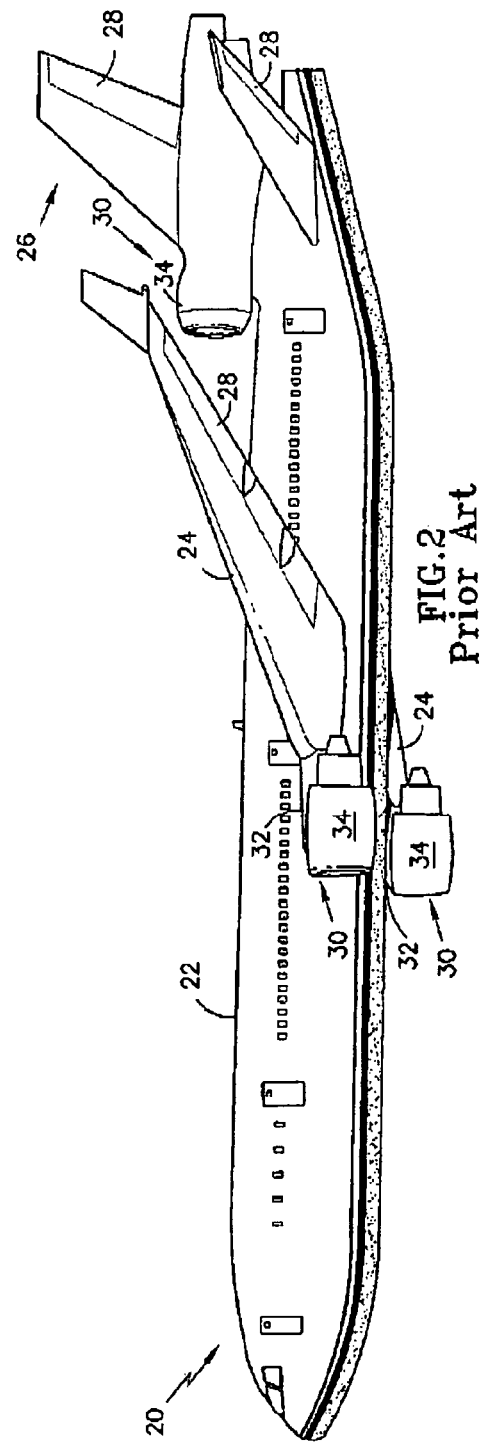
FIG. 2 illustrates a prior art aircraft airframe with conventional, wing-mounted and tail-mounted propulsion systems.
Figure 3:
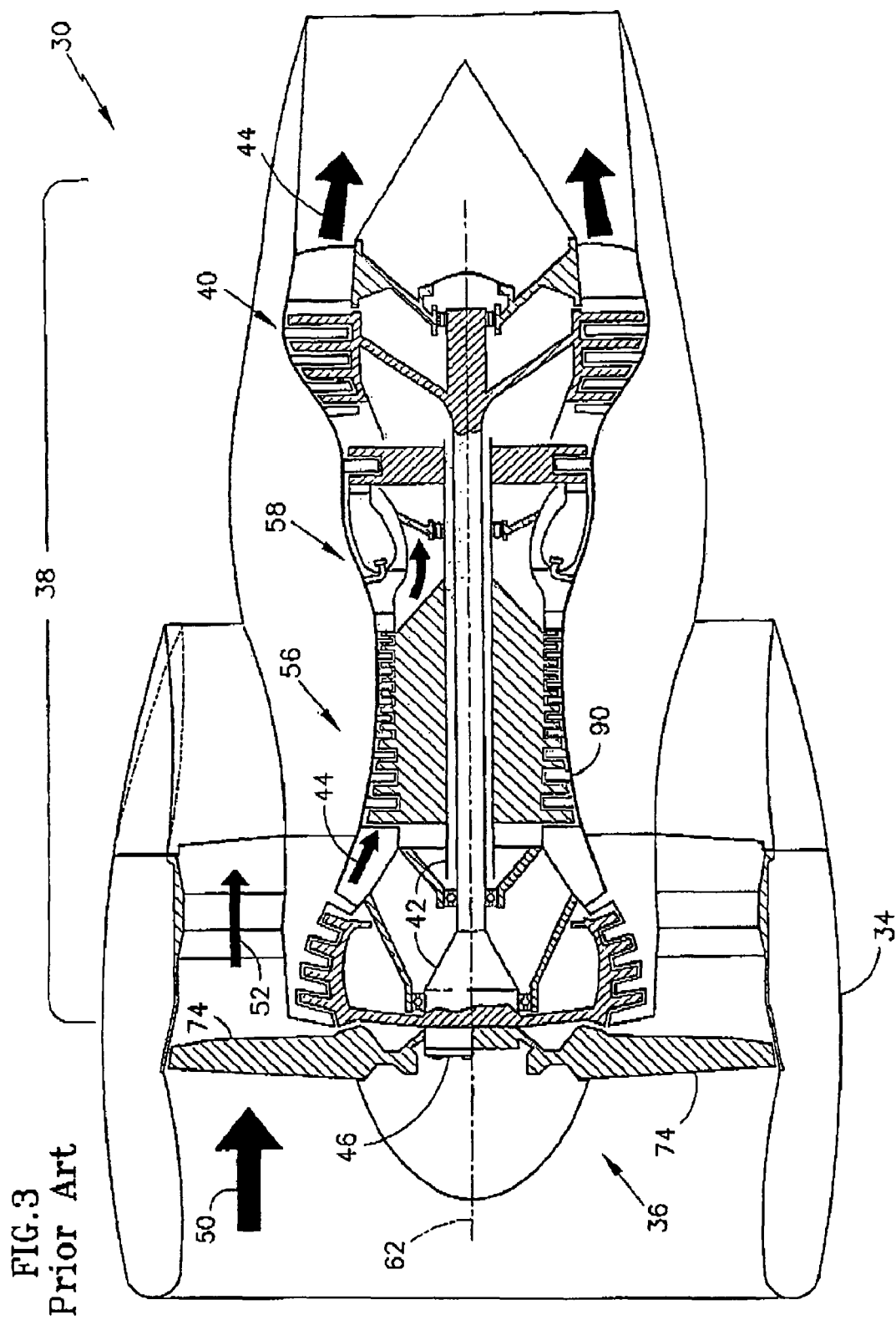
FIG. 3 illustrates a split sectional view of a prior art gas generator core with a directly driven bladed propulsion element on the lower half and a gear driven bladed propulsion element on the upper half.
Figure 4:
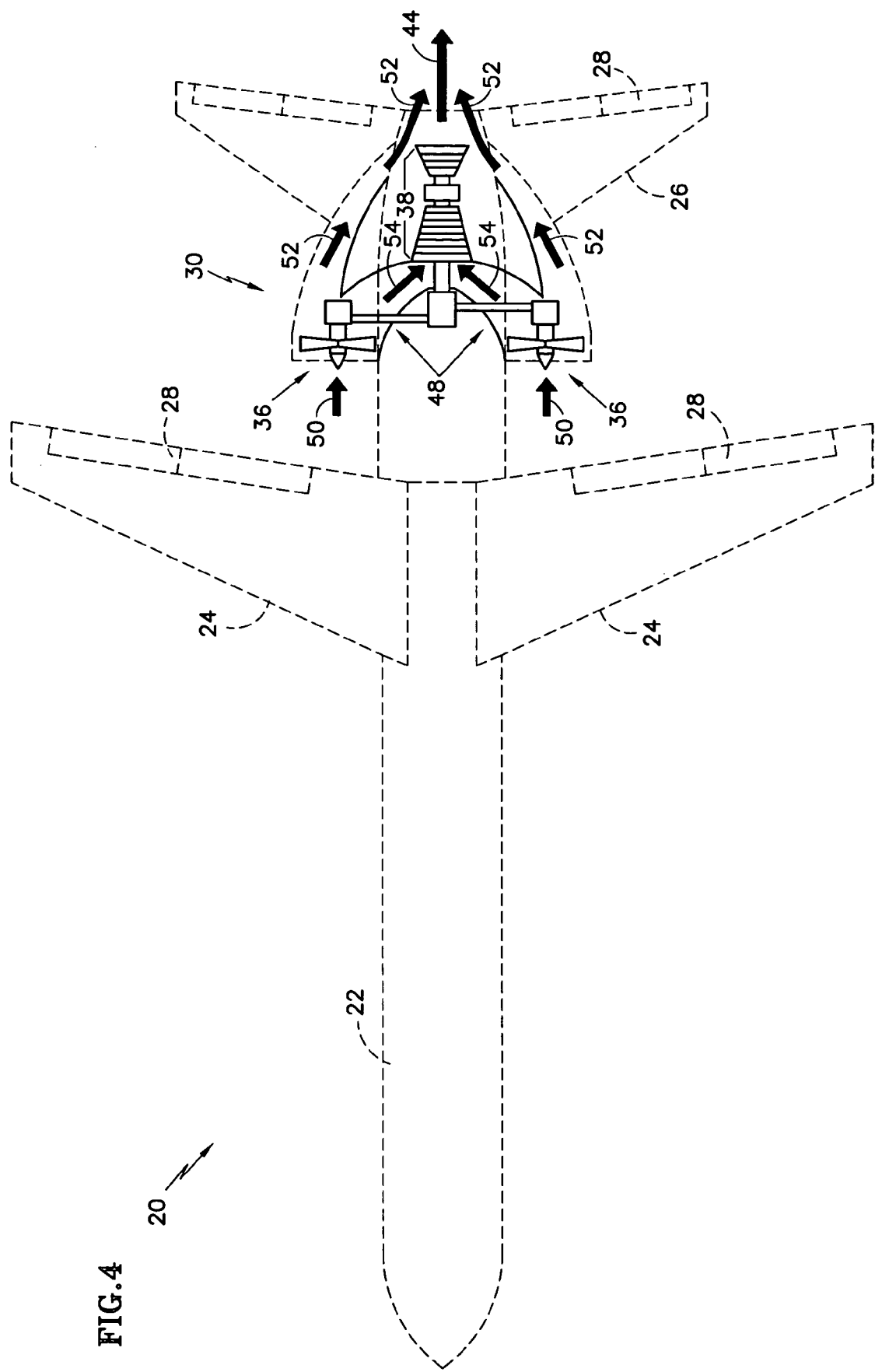
FIG. 4 illustrates a simplified, top sectional view of an aircraft airframe with a fuselage-mounted propulsion system according to an embodiment of the present invention.

A propulsion system 30 according to an embodiment of the present invention is illustrated in FIG. 4. Those skilled in the art will recognize an airframe 20 including a central, tubular fuselage 22 for carrying passengers and cargo, wings 24 extending outwardly from the fuselage 22 for providing lift, a rear mounted tail 26 and variable surfaces 28 for controlling the airframe 20 in flight. Mounted within the fuselage 22 and beneath the tail 26 is a propulsion system 30 including a single gas generator core 38 driving multiple bladed propulsion elements 36 via a power train 48. An ambient air stream 50 is directed rearward from the bladed propulsion elements 36 as a bypass stream 52 and a core stream 54. The bypass stream 52 is used for additional thrust, while the core stream 54 is directed into the core 38.

Figure 5:
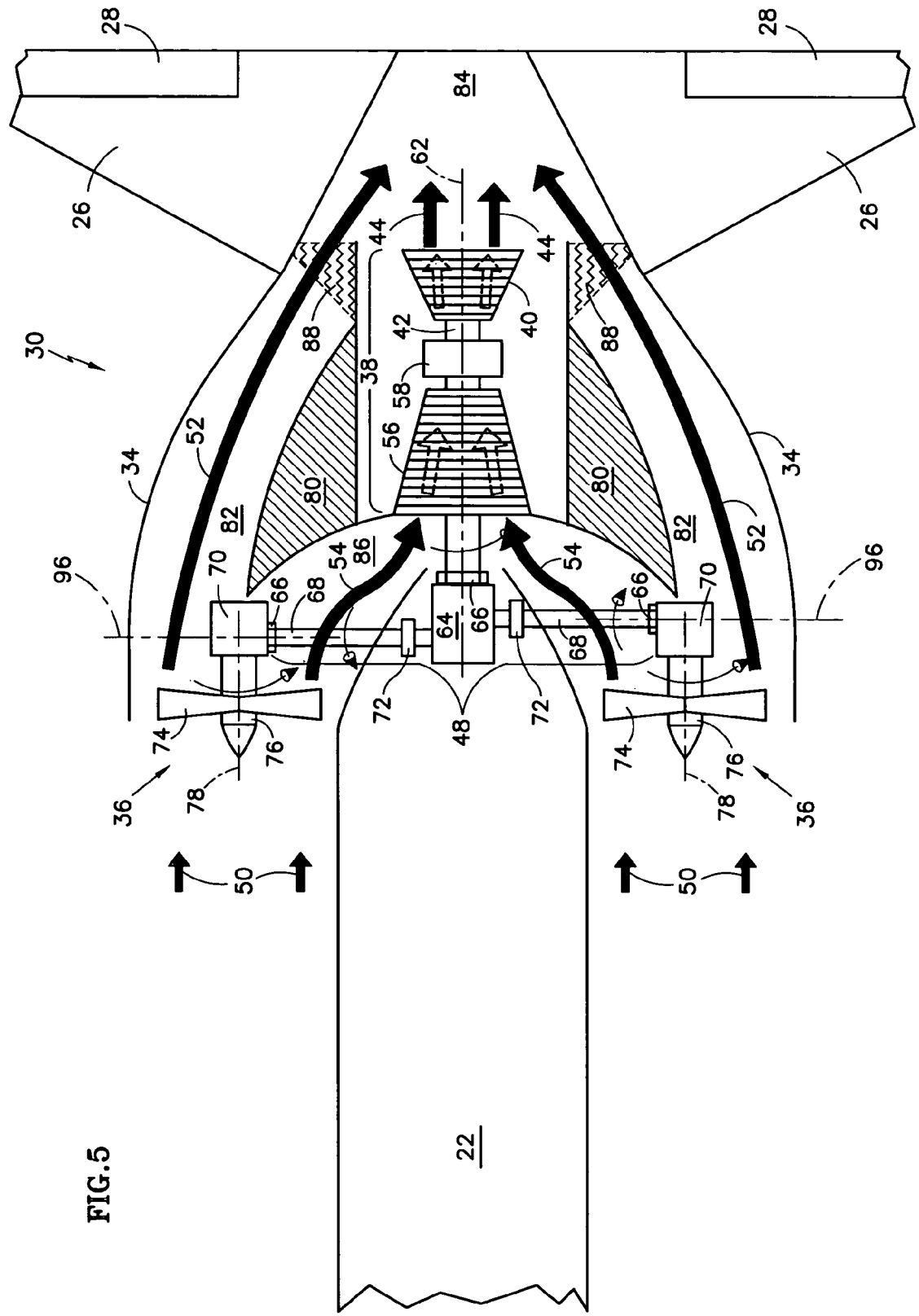
FIG. 5 illustrates a detailed top sectional view of the fuselage-mounted propulsion system of FIG. 4.

Directing your attention now to FIG. 5, further details of a present propulsion system 30 embodiment are illustrated. The gas generator core 38 includes a forward compressor 56 for compressing the core stream 54, a central combustor 58 where fuel is added and the mixture is burned and a rear turbine 40 for extracting energy from the expanding gases 44. The turbine 40 drives the compressor 56 via a primary shaft 42, which rotates about a longitudinal core axis 62. Although shown schematically in the figures, it is understood that the compressor 56 and turbine 40 typically contain alternating stages of blades and vanes. Also, multiple, concentric primary shafts 42 (not shown) may independently connect certain numbers of these stages.

Extending axially forward of the compressor 56 is a power train 48 driven by the core 38, forward of the compressor 56. The core 38 is coupled to a primary gearbox 64 by a bolted flange, universal joint, spline or other coupling means 66. The primary gearbox 64 permits the core 38 to drive two or more drive shafts 68 extending outwardly from the primary gearbox 64. Each of the drive shafts 68 is coupled to a secondary gearbox 70 by a bolted flange, universal joint, spline or other coupling means 66. A clutch, shear pin or other frangible means 72 is disposed between the primary gearbox 64 and each secondary gearbox 70. The frangible means 72 isolates the primary gearbox 64 in the event of a bladed propulsion element 36 or secondary gearbox 70 failure. Each secondary gearbox 70 permits a drive shaft 68 to drive a bladed propulsion element 36 extending forwardly from the secondary gearbox 70.

The bladed propulsion elements 36 each comprise a plurality of circumferentially distributed propulsion element blades 74 extending radially outwardly from a central, propulsion element hub 76. The bladed propulsion elements 36 rotate about a bladed propulsion element axis 78 that is not coaxial with the core axis 62. In a preferred embodiment, the bladed propulsion element axis 78 is parallel with the core axis 62. The bladed propulsion elements 36 are disposed outboard of the fuselage 22 and the propulsion element blades 74 impart energy to the ambient air stream 50, which is discharged rearward.

A splitter 80 spans between the forward most stage of the compressor 56 and the secondary gearboxes 70. The splitter 80 apportions the rearward discharged ambient air stream 50 into a bypass stream 52 and a core stream 54. The bypass stream 52 is directed rearward through a bypass duct 82 to an exhaust nozzle 84 at the rear of the fuselage 22 for use as thrust. The core stream 54 is directed rearward through an inlet duct 86 to the compressor 56. A bypass stream 52 to core stream 54 ratio of up to about 5:1 is possible with the present embodiment. An outer cowling 34 separates the bypass stream 52 from the ambient air stream 50 and reduces the aerodynamic drag of the propulsion system 30. A mixer 88 merges the radially outer bypass stream 52 with the inner core gases 44, immediately ahead of the nozzle 84. The mixer 88 reduces jet noise by providing a more uniform velocity profile of core gases 44 exiting the nozzle 84.

Figure 6:
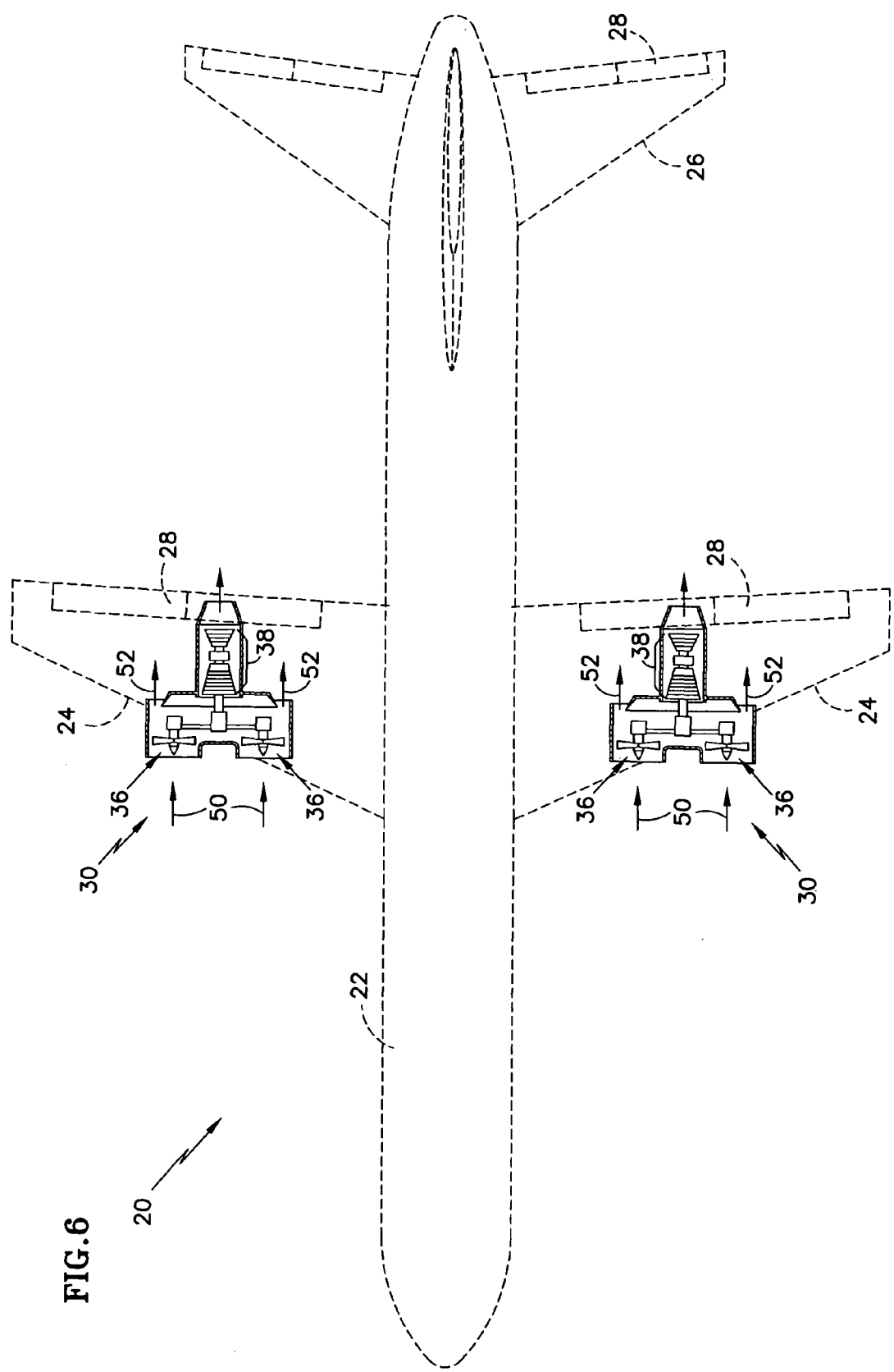
FIG. 6 illustrates a simplified, top sectional view of a commercial aircraft airframe with a wing-mounted propulsion system according to another embodiment of the present invention.

A propulsion system 30 according to another embodiment of the present invention is illustrated in FIG. 6. Details of the airframe 20 are as previously described and will not be included here for brevity. Suspended beneath each wing 24 is a propulsion system 30 including a single gas generator core 38, driving multiple bladed propulsion elements 36 with a power train 48. An ambient air stream 50 is directed rearward from the bladed propulsion elements 36 as a bypass stream 52 and a core stream 54. The bypass stream 52 is used for additional thrust, while the core stream 54 is directed into the core 38.

Figure 7:
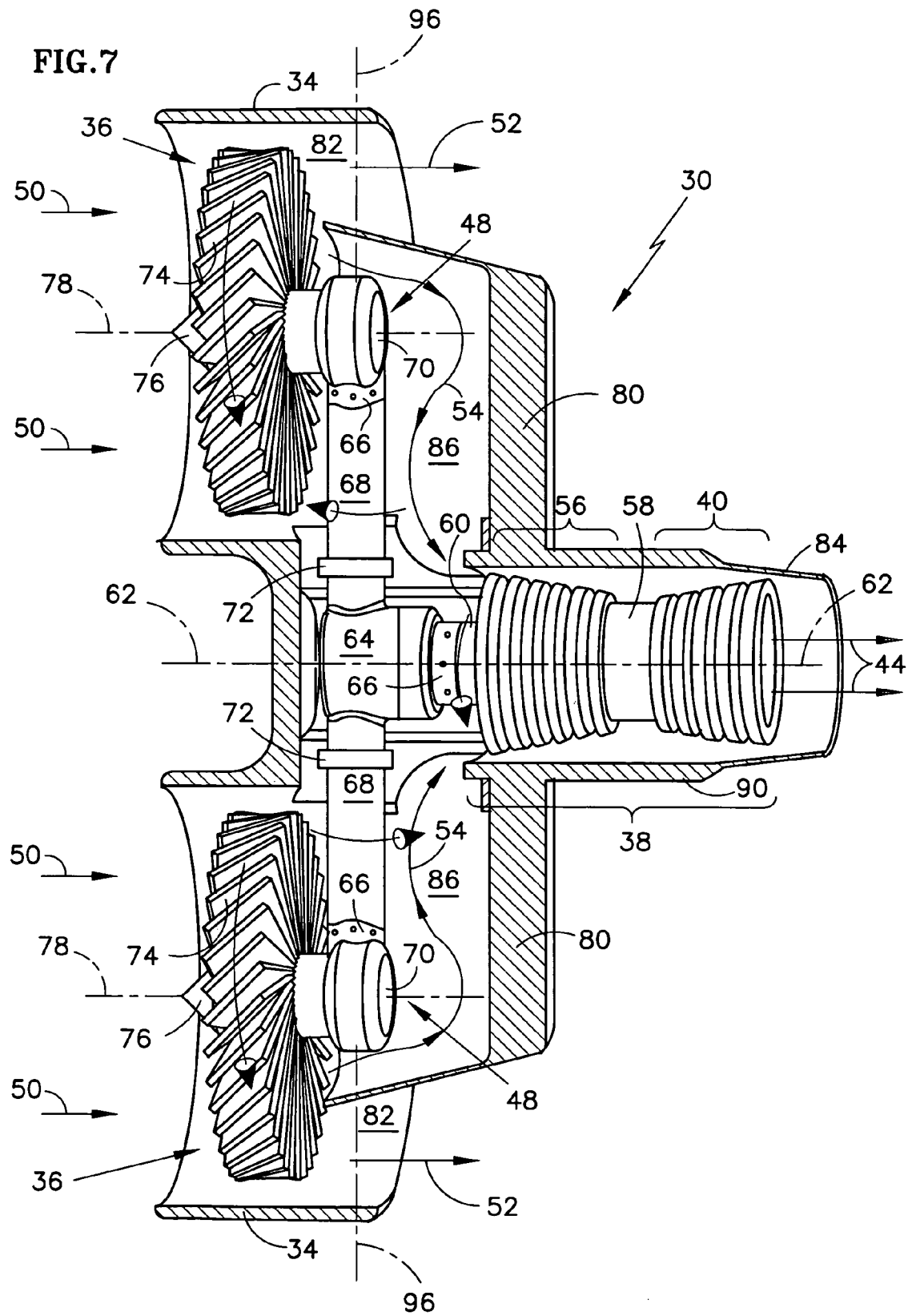
FIG. 7 illustrates a detailed top sectional view of the wing-mounted propulsion system of FIG. 6.

Directing your attention now to FIG. 7, further details of the present propulsion system 30 embodiment are illustrated. The gas generator core 38 includes a forward compressor 56 for compressing the core stream 54, a central combustor 58 where fuel is added and the mixture is burned and a rear turbine 40 for extracting energy from the expanding gases 44. The turbine 40 drives the compressor 56 via a primary shaft 42 (not shown), which rotates about a longitudinal core axis 62. Although shown schematically in the figures, it is to be understood that the compressor 56 and turbine 40 typically contain alternating stages of blades and vanes. Also, concentric primary shafts 42 (not shown) may independently connect certain numbers of these stages.

Extending axially forward of the compressor 56 is a power train 48. The core 38 drives the power train 48, forward of the compressor 56. The core 38 42 is coupled to a primary gearbox 64 by a bolted flange, universal joint, spline or other coupling means 66. The primary gearbox 64 permits the primary shaft 42 to drive two or more drive shafts 68 extending outwardly from the primary gearbox 64. Each of the drive shafts 68 is coupled to a secondary gearbox 70 by a bolted flange, universal joint, spline or other coupling means 66. A clutch, shear pin or other frangible means 72 is disposed between the primary gearbox 64 and each secondary gearbox 70. The frangible means 72 isolates the primary gearbox 64 in the event of a bladed propulsion element 36 or secondary gearbox 70 failure. Each secondary gearbox 70 permits a drive shaft 68 to drive a bladed propulsion element 36 extending forwardly from the secondary gearbox 70.

The bladed propulsion elements 36 each comprise a number of circumferentially distributed propulsion element blades 74 extending radially outwardly from a central, propulsion element hub 76. The bladed propulsion elements 36 rotate about a bladed propulsion element axis 78 that is not coaxial with the core axis 62. In a preferred embodiment, the bladed propulsion element axis 78 is parallel to the core axis 62. The bladed propulsion elements 36 are disposed beneath the wings 24 and the propulsion element blades 74 discharge the ambient air stream 50 rearward.

A splitter 80 spans between the forward most portion of the compressor 56 and the propulsion element blades 74. The splitter 80 apportions the rearward discharged ambient air stream 50 into the bypass stream 52 and the core stream 54. The bypass stream 52 is directed rearward through a bypass duct 82 for use as thrust. The core stream 54 is directed rearward through an inlet duct 86 to the compressor 56. A bypass stream 52 to core stream 54 ratio of approximately 5:1 is possible with the present embodiment. An outer cowling 34 separates the bypass stream 52 from the ambient air stream 50 and reduces the aerodynamic drag of the propulsion system 30. An exhaust nozzle 84 directs the core gases 44, exiting the turbine 40, rearward as thrust.

Figure 8:
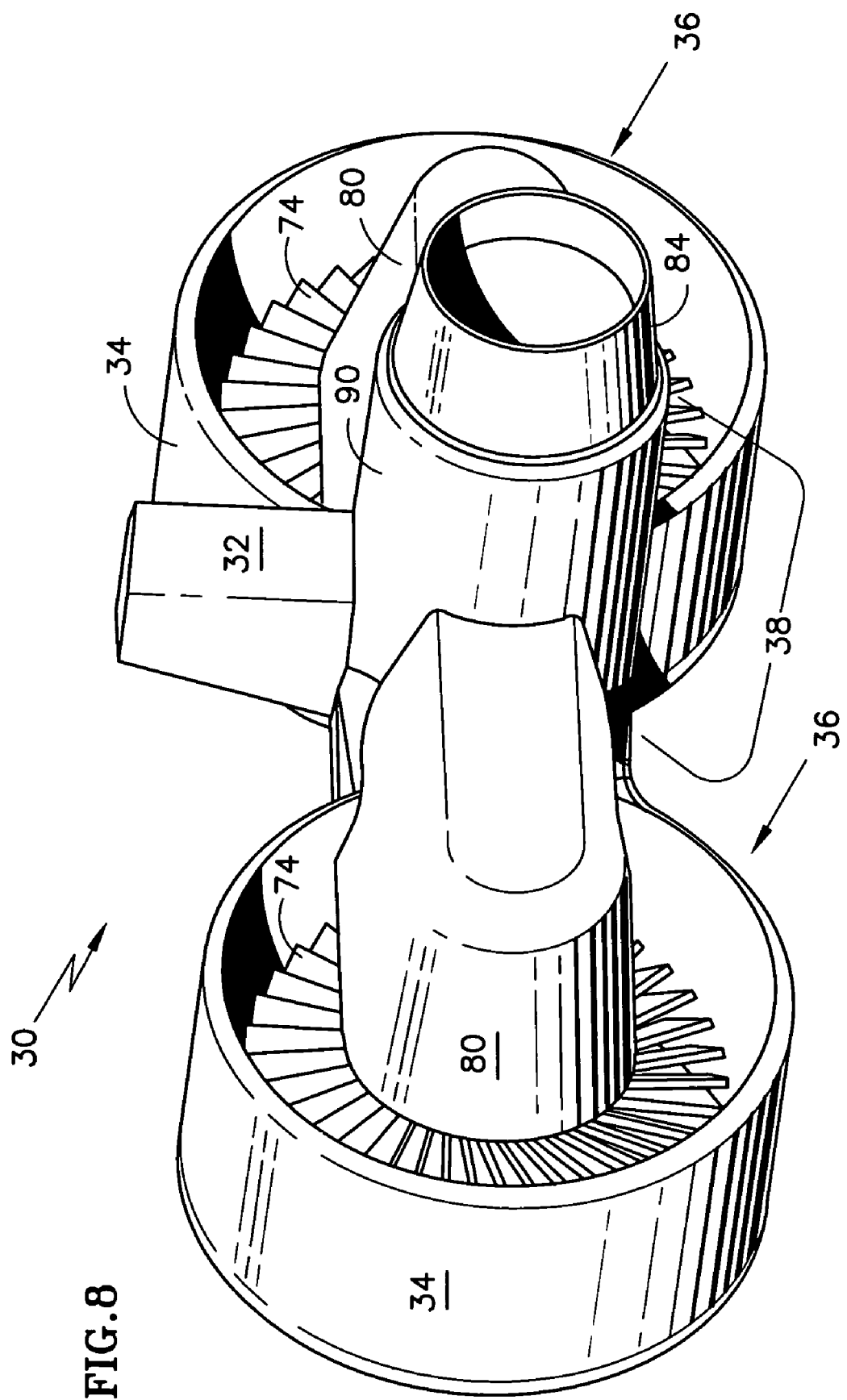
FIG. 8 illustrates a rear perspective view of the wing-mounted propulsion system of FIGS. 6 and 7.

The present propulsion system 30 is suspended beneath a wing 24 from a pylon 32, as illustrated in FIG. 8. The pylon 32 extends radially between the wing 24 (not shown) and a structural case 90, surrounding the core 38.

Figure 9:
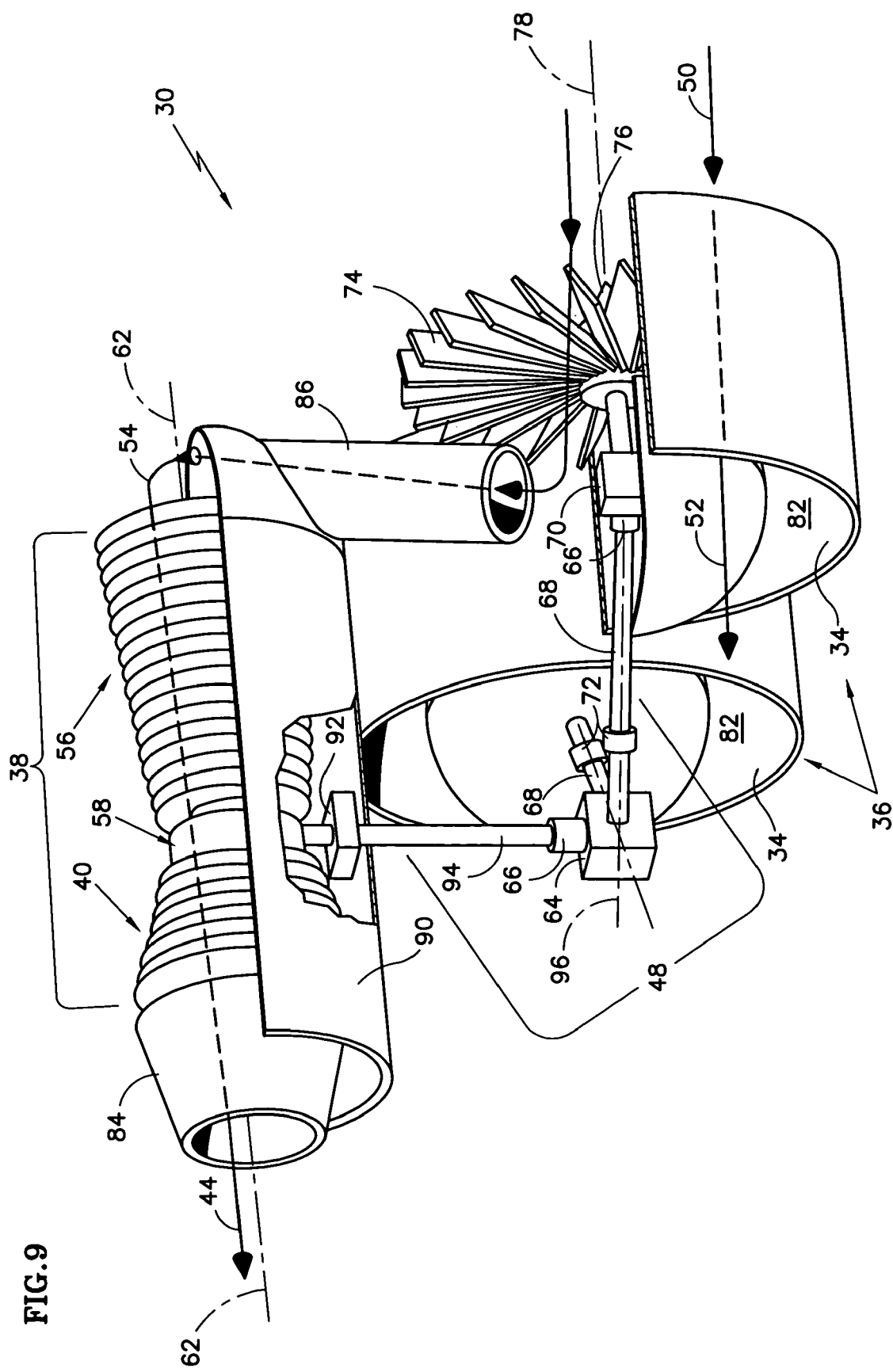
FIG. 9 illustrates a rear perspective view of a fuselage or wing-mounted propulsion system according to yet another embodiment of the invention.

Directing your attention now to FIG. 9, details of yet another embodiment of a propulsion system 30 are illustrated. The gas generator core 38 includes a forward compressor 56 for compressing the core stream 54, a central combustor 58 where fuel is added and the mixture is burned and a rear turbine 40 for extracting energy from the expanding core gases 44. The turbine 40 drives the compressor 56 via a primary shaft 42 (not shown), which rotates about a longitudinal core axis 62. Although shown schematically in the figures, it is to be understood that the compressor 56 and turbine 40 typically contain alternating stages of blades and vanes. Also, concentric primary shafts 42 (not shown) may independently connect certain numbers of these stages.

The core 38 drives a central gearbox 92, disposed axially between the compressor 56 and the turbine 40. Extending radially outwardly from the central gearbox 92 is a power train 48. The power train 48 includes a radially extending tower shaft 94, driven by the central gearbox 92. A radially outer end of the tower shaft 94 is coupled to a primary gearbox 64 by a bolted flange, universal joint, spline or other coupling means 66. The primary gearbox 64 permits the tower shaft 94 to drive two or more drive shafts 68 extending outwardly from the primary gearbox 64. Each of the drive shafts 68 is coupled to a secondary gearbox 70 by a bolted flange, universal joint, spline or other coupling means 66. A clutch, shear pin or other frangible means 72 is disposed between the primary gearbox 64 and each secondary gearbox 70. The frangible means 72 isolates the primary gearbox 64 in the event of a bladed propulsion element 36 or secondary gearbox 70 failure. Each secondary gearbox 70 drives a bladed propulsion element 36 extending forwardly from the secondary gearbox 70.

The bladed propulsion elements 36 each comprise a number of circumferentially distributed propulsion element blades 74 extending radially outwardly from a central, propulsion element hub 76. The bladed propulsion elements 36 rotate about a bladed propulsion element axis 78 that is not coaxial with the core axis 62. In a preferred embodiment, the bladed propulsion element axis 78 is parallel to the core axis 62. The propulsion element blades 74 impart energy to the ambient air stream 50, which is discharged rearward.

The discharged ambient air stream 50 is apportioned into a bypass stream 52 and a core stream 54. The bypass stream 52 is directed rearward through a bypass duct 82 for use as thrust. The core stream 54 is directed radially upward through an inlet duct 86 to the compressor 56. A bypass stream 52 to core stream 54 ratio of approximately 5:1 is possible with the present embodiment. An outer cowling 34 separates the bypass stream 52 from the ambient air stream 50 and reduces the aerodynamic drag of the propulsion system 30. An exhaust nozzle 84 directs the core gases 44 from the turbine 40 for use as thrust.

According to each of the foregoing propulsion system 30 examples, each drive shaft 68 rotates about a longitudinal, drive shaft axis 96. The driveshaft axes 96 are not parallel to the core axis 62 and in some embodiments the driveshaft axes 96 are perpendicular to the core axis 62. In the embodiments illustrated, the driveshaft axes 96 are coplanar with the core axis 62, but in certain applications, they may not be coplaner. The primary 64 and secondary 70 gearboxes provide the flexibility of tailoring bladed propulsion element 36 speed and direction. Gearboxes 64, 70 may be designed to provide optimal compressor 56 and turbine 40 speeds, while simultaneously providing optimal blade 74 speed for improved efficiency. The bladed propulsion element 36 direction may be tailored to suit a particular application. For instance, the bladed propulsion elements 36 may counter rotate or co rotate as required.

The exemplary propulsion systems 30 provide reduced fuel burn and weight by driving multiple bladed propulsion elements 36 with a single gas generator core 38. Very high bypass ratios result from the increased frontal areas and bypass streams 52 provided by the multiple bladed propulsion elements 36. The bladed propulsion elements 36 also provide adequate runway clearance when suspended from pylons 32 beneath the wings 24. Because only a single core 38 is used, the fuel burn, weight and cost of the entire propulsion system 30 is substantially reduced over conventional propulsion systems 30.

Other alternatives, modifications and variations will become apparent to those skilled in the art having read the foregoing description. Accordingly, the invention embraces those alternatives, modifications and variations as fall within the broad scope of the appended claims.

What is claimed is:

1. A propulsion system comprising:
  a gas generator core including a forward compressor and a rearward turbine joined by a primary shaft rotational about a longitudinal core axis, the shaft projecting forward of the compressor;
  a power train having a primary gearbox and multiple secondary gearboxes, where the primary gearbox is driven by the primary shaft and driving multiple drive shafts and each secondary gearbox is driven by a drive shaft and driving a fan, where the power train is driven by said primary shaft and driving multiple bladed propulsion elements, each bladed propulsion element rotating about a bladed propulsion element axis that is not coaxial with the core axis, and each bladed propulsion element discharging an air stream rearward; and an inlet duct for directing a portion of the discharged air streams rearward to the compressor.

2. The propulsion system of claim 1 wherein said power train further comprises a frangible means between the primary gearbox and each of the secondary gearboxes.

3. The propulsion system of claim 2, wherein each drive shaft rotates about a drive shaft axis, the drive shaft axes being at an angle to the core axis.

4. The propulsion system of claim 3, wherein the drive shaft axes are perpendicular to the core axis.

5. The propulsion system of claim 4, wherein the drive shaft axes and the core axis are coplanar.

6. The propulsion system of claim 1, wherein the bladed propulsion elements rotate in the same direction as one another.

7. The propulsion system of claim 1, wherein the bladed propulsion elements counter rotate with respect to one another.

8. A propulsion system comprising:

a gas generator core including a forward compressor, a central gearbox and an rearward turbine, said core rotationally disposed about a longitudinal core axis and driving a tower shaft from the gearbox;

a power train having a primary gearbox and multiple secondary gearboxes, where the primary gearbox is driven by the tower shaft and driving multiple drive shafts and each secondary gearbox being driven by a drive shaft and driving a fan, where the power train is driven by said tower shaft and driving multiple bladed propulsion elements, each bladed propulsion element rotating about a bladed propulsion element axis that is not coaxial with the core axis, and each bladed propulsion element discharging an ambient air stream rearward; and an inlet duct for directing a portion of the discharged air streams rearward into the compressor.

9. The propulsion system of claim 8, wherein said power train further comprises a frangible means between the primary gearbox and each secondary gearbox.

10. The propulsion system of claim 8, wherein each drive shaft rotates about an axis, the drive shaft axes being substantially parallel with the core axis.

11. The propulsion system of claim 8, wherein the bladed propulsion elements rotate in the same direction as one another.

12. The propulsion system of claim 8, wherein the bladed propulsion elements counter rotate with respect to one another.

13. A propulsion system comprising:

a gas generator core including a compressor driven by a shaft rotating about a longitudinal core axis;

a power train driven by the core, reward of the compressor, connecting the shaft to multiple bladed propulsion elements, each bladed propulsion element rotating about a bladed propulsion element axis that is not coaxial with the core axis and each bladed propulsion element discharging an ambient air stream rearward; and an inlet duct for directing a portion of the discharged air streams from the bladed propulsion elements into the compressor.

* * * * *